Aug. 12, 1947.　　C. C. S. LE CLAIR　　2,425,700
LUBRICANT CIRCULATING SYSTEM INCORPORATING FILTERING MEANS
Filed Nov. 26, 1943　　2 Sheets-Sheet 1
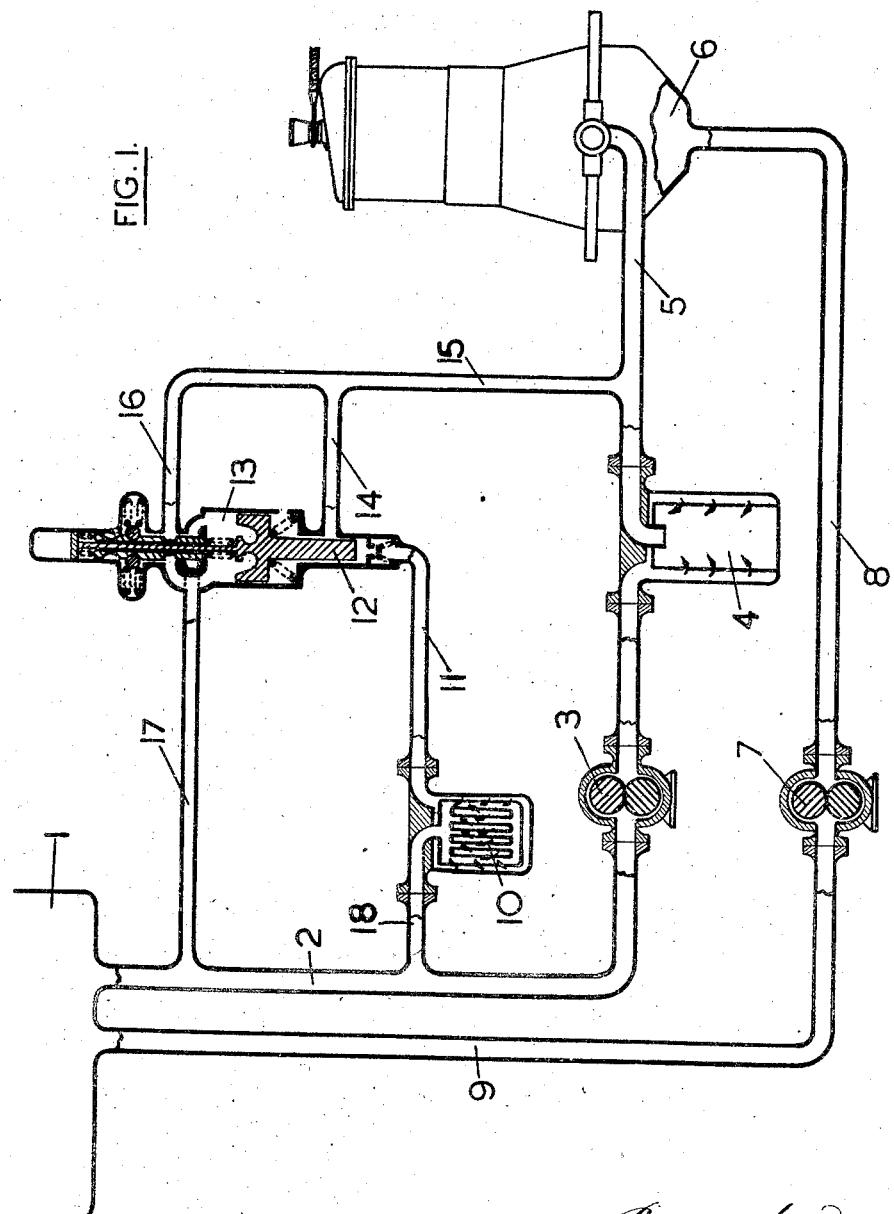

Aug. 12, 1947.     C. C. S. LE CLAIR     2,425,700
LUBRICANT CIRCULATING SYSTEM INCORPORATING FILTERING MEANS
Filed Nov. 26, 1943     2 Sheets-Sheet 2
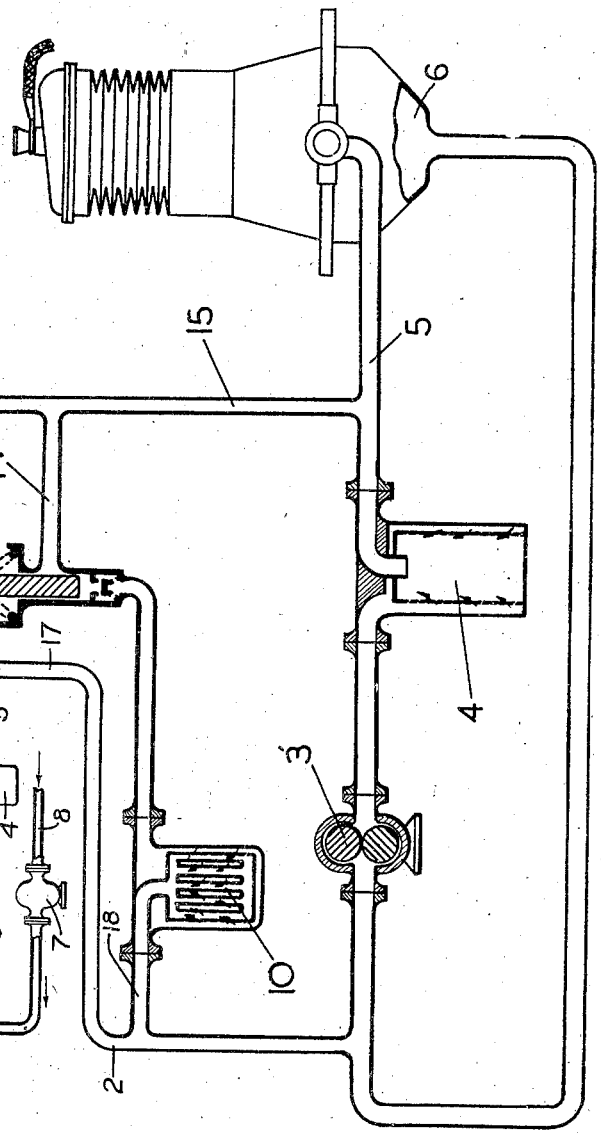
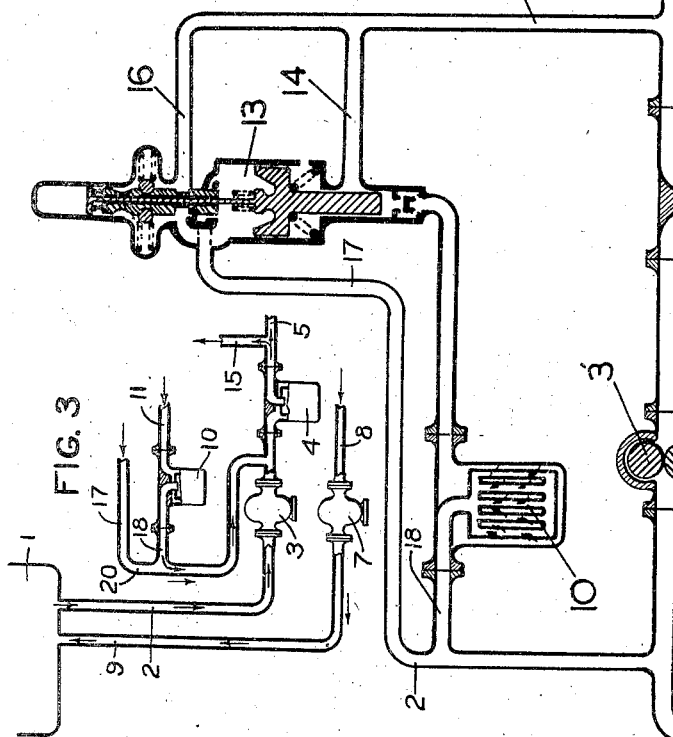
Inventor
Camille Clave Sprankling Le Clair
By Williams, Bradbury & Hinkle
Attorneys Patented Aug. 12, 1947

2,425,700

UNITED STATES PATENT OFFICE 2,425,700

LUBRICANT CIRCULATING SYSTEM INCORPORATING FILTERING MEANS

Camille Clare Sprankling Le Clair, Acton, London, England

Application November 26, 1943, Serial No. 511,770 In Great Britain October 2, 1942

Section 1, Public Law 690, August 8, 1946. Patent expires October 2, 1962

8 Claims. (Cl. 184—6)

This invention relates to the filtering of oils in general and is more particularly applicable to the filtering of lubricating oil for engines of automobiles and aircraft or machines.

In known forced lubrication systems for engines, oil is usually pumped from a reserve tank to the engine bearings, pistons, valves and so on, and is then allowed to fall into a sump from which it is pumped back to the reserve tank and thence again to the engine.

In its passage through bearings and over cylinder walls, the oil becomes contaminated with fine metallic and other particles, which it is highly desirable to remove before it is circulated again.

This removal of contamination from the oil is effected by passing the oil through a filter either on its way from the sump to the reserve tank or between the tank and the engine. It has now been established that the thickness of the oil film on the pressure side of a modern automobile or aircraft engine bearing is extremely small and that in order that filtering may be really effective it is not sufficient merely to take out the larger particles, say those over 20 to 25 microns, but it is essential to remove all the particles down to something very much smaller, say 2 or 3 microns at most, so that what is left may pass freely through the thinnest oil films.

In practice, however, this involves very serious difficulty in that if the filter is made sufficiently fine to take out all particles down to the suggested 2 or 3 microns, the resistance involved in passing the whole of the lubricating oil at every circuit of the system through the filter either produces an impossibly high back pressure or necessitates an impossibly large filter.

The object of this invention, therefore, is to overcome, or at least mitigate this difficulty.

According to the present invention, an oil circulating system, such as the lubricating system of an engine or machine (all referred to hereinafter as an "engine lubricating system") is characterised by the feature that the whole of the oil circulated from an oil supply source to the engine sump and from the sump back to the supply source, or from the sump back to the sump, is passed at every circuit through a coarse filter which is adapted to remove the coarse particles from the oil and which does not create undue back pressure opposing the oil flow, some of the oil circulated being withdrawn by a pump and forced at a higher pressure through a secondary circuit including a fine filter which is adapted to remove the smaller particles from the oil, whereafter this fine-filtered oil is returned to the system. Thus, in the case of a system in which the oil is drawn from an oil supply tank, the whole of the oil circulated from the oil tank to the sump and from the sump back to the tank is passed at every circuit through a coarse filter which is adapted to remove the larger particles from the oil and which does not create undue back pressure opposing the oil flow, a small quantity of the oil circulated being withdrawn and passed through a secondary circuit including a fine filter which is adapted to remove the smaller particles from the oil. The fine filter is naturally much finer than the coarse filter and, therefore, a high back pressure may be built up and oppose the flow of the oil in the fine filter or secondary circuit. This high pressure is overcome by using a force pump, which may be driven either by an oil motor supplied with oil taken from the pressure zone of the system or by some other convenient means such as a moving part of the engine.

Thus, by this invention, the whole of the oil circulated to and from the engine is passed through a coarse filter at every circulation so that the large particles are removed before the oil is re-used and, in addition, a percentage (which may be small) of the total oil circulated (preferably drawn from the outlet side of the coarse filter and returned to a convenient low pressure position in the system) is passed continuously through the fine filter. In this manner, the oil circulated to and from the engine is continuously ridded of the smaller particles which have not been removed by the coarse filter and which would otherwise tend to accumulate.

Two constructional forms of the invention are shown, by way of example, on the accompanying drawings, whereon—

Fig. 1 is a diagrammatic view of an aircraft engine lubricating system in which the oil is drawn from and returned to an oil supply tank;

Fig. 2 is a diagrammatic view of a modification which does not include an oil supply tank and which is more particularly applicable to the engine of a motor vehicle; and Fig. 3 is a fragmentary diagrammatic view of a modification of the system illustrated in Fig. 1.

Referring to Fig. 1:

Oil is drawn from an oil reserve tank 1 through a pipe 2 by means of a main pump 3 which forces the oil under pressure through a main filter 4 arranged to remove the larger particles from the oil. The filter is sufficiently coarse to allow all the oil in circulation to be passed through it at every circuit without undue pressure drop.

From the coarse filter, the filtered oil flows through a pipe 5 to parts of the engines to be lubricated, such as the main and crank-shaft bearings, pistons, valves and so on. The engine is provided with an oil sump 6 with which the suction side of an auxiliary or scavenge pump 7 is connected by a pipe 8, the discharge side of the pump being connected by a pipe 9 to the oil tank.

The inlet of a secondary filter 10 adapted to remove the finer particles from the oil is connected by a pipe 11 to the outlet of a small force pump 12 driven by an oil motor 13 of known construction, the inlet of the pump being connected by pipes 14 and 15 to the discharge pipe 5 from the coarse filter 4.

A pipe 16 branched from the pipe 15 connected to the force pump inlet supplies oil to the cylinder of the driving motor 13 and the outlets of the cylinder and of the fine filters are both connected respectively by pipes 17 and 18 to the suction pipe 2 of the main pump 3.

Thus, a quantity of coarse-filtered oil is continuously withdrawn from the main circuit via the pipes 15 and 14 by the force pump 12 and forced through the pipe 11 into the fine filter 10. The fine-filtered oil and the oil from the cylinder of the motor 13 is returned to the main circuit suction pipe 2 through the pipes 18 and 17. The oil from the fine filter and from the said cylinder may, however, be returned to any other convenient part of the system, such as to the inlet side of the coarse filter as illustrated in Fig. 3. In this figure the pipes 17 and 18 are connected to the inlet side of the coarse filter by pipe 20. If desired, the oil could be returned to any other convenient low pressure part of the system such as to the suction pipe 8 of the said auxiliary pump 7, or direct to the oil tank 1 or to the engine sump 6.

The modified arrangement shown in Fig. 2 differs from that of Fig. 1 in that the oil supply tank 1, the auxiliary or scavenge pump 7 and the piping 8 and 9 are omitted. The main pump 3 merely takes its supply of unfiltered oil from the engine sump 6 and, as in the arrangement of Fig. 1, the outlet 18 from the fine filter and the outlet 17 from the oil motor are joined together and led to the suction side of the main pump 3. In other respects this arrangement is the same as that shown in Fig. 1.

Instead of drawing coarse-filtered oil from the main circuit, the force pump could be arranged to draw unfiltered oil from the main circuit but such an arrangement would not be advantageous since unfiltered oil would be supplied to the fine filter and would clog it up more quickly.

Similarly, the driving cylinder of the oil motor could be supplied with unfiltered oil and this arrangement would have the advantage that the unfiltered oil being at a higher pressure than the filtered oil (by an amount equal to the pressure drop in the coarse filter) less oil and a smaller cylinder would be required to drive the pump, but it would suffer from the disadvantage that the said cylinder would be supplied with unfiltered oil.

I claim:

1. In an engine lubricating system, a main circuit including an oil supply source, a main pump, main conduit means connecting said main pump with the point to be lubricated, and a coarse filter disposed in said main conduit means between said main pump and the point to be lubricated, whereby the latter is supplied with coarse filtered oil, a branch circuit from said main conduit means, said branch circuit including a supplementary pump, a connection between said main conduit means and the inlet of said supplementary pump, a fine filter connected to the outlet of said supplementary pump, said supplementary pump acting to force oil through said fine filter at a higher pressure than the main circuit pressure and to return it to said main circuit, and a connection between said fine filter and the main circuit, said main pump being adapted to withdraw sufficient oil from said supply source to supply the point to be lubricated and also to supply said branch circuit.

2. In an engine lubricating system, a main circuit including an oil supply source formed by the engine sump, a main pump, conduit means connecting the engine sump with the inlet of said main pump, main conduit means connecting the main pump outlet with the point to be lubricated, and a coarse filter disposed in said main conduit means between said main pump and the point to be lubricated, whereby the latter is supplied with coarse filtered oil, a branch circuit from said main conduit means, said branch circuit including a supplementary pump adapted to operate at a higher pressure than said main pump, a connection between said main conduit means and the inlet of said supplementary pump, a fine filter connected to the outlet of said supplementary pump, said supplementary pump acting to force oil at a higher pressure than the main circuit pressure through said fine filter and to return it to the main circuit, said main pump being adapted to withdraw sufficient oil from said engine sump to supply the point to be lubricated and also to supply said branch circuit.

3. In an engine lubricating system, a main circuit including an oil supply tank, an engine sump, a main pump having its inlet connected to said supply tank, main conduit means connecting said main pump with the point to be lubricated, and a coarse filter disposed in said main conduit means between said main pump and the point to be lubricated, whereby the latter is supplied with coarse filtered oil, a branch circuit from said main conduit means, said branch circuit including a supplementary pump, a connection between said main conduit means and the inlet of said supplementary pump, a fine filter connected to the outlet of said supplementary pump, said supplementary pump acting to force oil at a higher pressure than the main circuit pressure and to return it to the main circuit, a connection between said fine filter and the main circuit, said main pump being adapted to withdraw sufficient oil from said supply tank to supply the point to be lubricated and also to supply said branch circuit, and a scavenge circuit including a scavenge pump for returning oil to said supply tank from the engine sump.

4. The combination set forth in claim 1, wherein the inlet side of said supplementary pump is connected to the outlet side of said coarse filter, and the outlet side of said fine filter is connected to the inlet of said main pump.

5. The combination set forth in claim 1, wherein the inlet side of said supplementary pump is connected to the outlet side of said coarse filter, and the outlet side of said fine filter is connected to the inlet side of said coarse filter.

6. The combination set forth in claim 1, wherein said supplementary pump is a force pump adapted to overcome the high back pressure which may be developed in said fine filter and thus oppose the flow of oil in said fine filter and the branch circuit.

7. The combination set forth in claim 1, wherein said supplementary pump is a force pump adapted to overcome the high back pressure which may be developed in said fine filter and thus oppose the flow of oil in said fine filter and the branch circuit, said force pump being driven by an oil motor deriving its power from the main circuit pressure.

8. The combination set forth in claim 1, wherein said supplementary pump is a force pump adapted to overcome the high back pressure which may be developed in said fine filter and thus oppose the flow of oil in said fine filter and the branch circuit, said force pump having its inlet connected to the pressure side of the main circuit and its outlet connected to the suction side thereof.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 1,462,175 | Hans | July 17, 1933 |
| 1,857,651 | McKinley | May 10, 1932 |
| 1,906,418 | Renfrew | May 2, 1933 |
| 1,595,432 | Vincent | Aug. 10, 1926 |
| 2,322,463 | McDonald | June 22, 1943 |